EXPANSIBLE CARRYING CASE WITH WEB HAVING TWO STABLE STATES

Original Filed Aug. 24, 1967

United States Patent Office

Re. 27,486
Reissued Sept. 26, 1972

27,486
EXPANSIBLE CARRYING CASE WITH WEB HAVING TWO STABLE STATES

Herbert Gordon Dyke, Little Silver, N.J.
(206 E. 35th St., New York, N.Y. 10016)

Original No. 3,480,118, dated Nov. 25, 1969, Ser. No. 663,038, Aug. 24, 1967. Application for reissue Nov. 23, 1971, Ser. No. 201,534
Int. Cl. A45c *7/100*
U.S. Cl. 190—44 18 Claims

Matter enclosed in heavy brackets [ ] appears in the original patent but forms no part of this reissue specification; matter printed in italics indicates the additions made by reissue.

ABSTRACT OF THE DISCLOSURE

Expansible carrying case with a peripheral web about an expansion joint. The web holds the joint contracted or opened up, and in opened state serves as the wall for that portion of the carrying case. The web has two stable states, flat or folded, and can be flipped over from one to the other. If it folds in, it has at least one somewhat stiff strip that tends to push out flat. If it folds out, it has an elastic pull that tends to hold it in flat.

This invention is an expansible carrying case. It is often desirable to be able to enlarge the capacity of a suitcase, frequently during the course of a trip. The same is true *of* dispatch cases. These and all similar articles to which this invention is applicable will herein be called carrying cases.

A desired characteristic for an expansible carrying case is that it shall be neat and trim and free of external straps, latches, etc. that can spoil or at best limit its styling. Another is that the parts of the case to both sides of the joint be of the same height and length. Another desired characteristic is that in the closed configuration the opposed edges at the enlargement joint shall everywhere be held snugly together, so they are not apt to become warped or twisted and unpresentable in appearance, nor likely to gape and catch on some protuberance when in use and be damaged. Cost is of course a factor too.

In the present invention I improve over such prior art at U.S. Patent No. 2,002,878 to Belber in the characteristic, among others, that in the contracted condition the carrying case of the present invention has its edges held together continuously throughout essentially the entire periphery of the enlargement joint.

The drawings show an illustrative embodiment of my invention.

In this invention I extrude a long continuous length of elastomeric plastic which is flexible where thin and comparatively stiff where thick.

Figure 3:
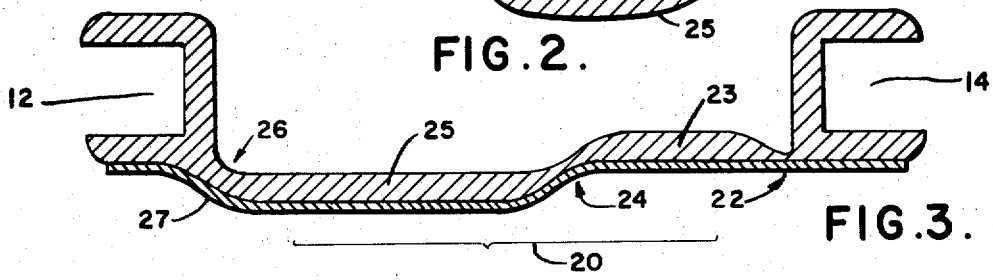
FIGURE 3 is a transverse vertical cross-section of the expanded joint.

I extrude in any configuration suitable for the extrusion die, for example, in the cross-sectional form seen in FIGURE 3.

The extrusion has a cross-section, in its preferred form, that gives at each end a channel 12, 14 with an outwardly open mouth, which will fit over the peripheral edge 13, 15 of the carrying case body and serve both as a holding means and as a binding. Integrally joining these two end channels in an intermediate web 20 of thickness sufficient to have some fair degree of stiffness across the web shape. It has in it two localities 22, 24 which are of distinctly thinner cross-section. One of these, 22, is located where the web 20 meets the channel 14 at one side, and the other, 24, is located a little less than halfway from that channel to the other channel 12.

In the preferred embodiment, the relatively stiff portion 23 of the web between the two thin locations is slightly convex up, while the other relatively stiff part of the web 25 is slightly convex down.

If desired I laminate a thin strip of non-stretch fabric 27 to one or both surfaces. This serves as an anti-sag means, and also can help adapt the appearance to desired styling.

A length of this elastomeric extrusion sufficient to go once around the periphery of the carrying case has its channels fitted over the opposed peripheral edges of the carrying case. At the joint where the ends of the strip meet they may be vulcanized together or a fabric patch may be cemented to each side of the member, covering the joint, or any other desired treatment may be given.

Assuming, as shown in FIGURE 3, that the web portion 20 of the extrusion is recessed down, that is toward the interior of the carrying case, from the channels about the edges of the case, the web portions can fold inwardly for bringing the carrying case to a contracted position. Pressure downwardly on the middle of the web, near a corner of the carrying case, will cause the opposed edges of the suitcase body to draw together. The web will bend down from a very shallow V shape to progressively narrower V shapes. At the corner of the carrying case as the two web portions fold in to a narrow V shape, the peripheral path of the bottom of the V which coincides with the thin section longitudinal flex hinge 24 near the middle of the web will convolute into S curves. This is because the peripheral distance spaced this much inwardly from the original peripheral distance around the web is distinctly shorter. It is necessary, therefore, that the elastomeric extrusion have enough flexibility in even its relatively stiff portions of the web to assume these transitional S curves.

Figure 1:
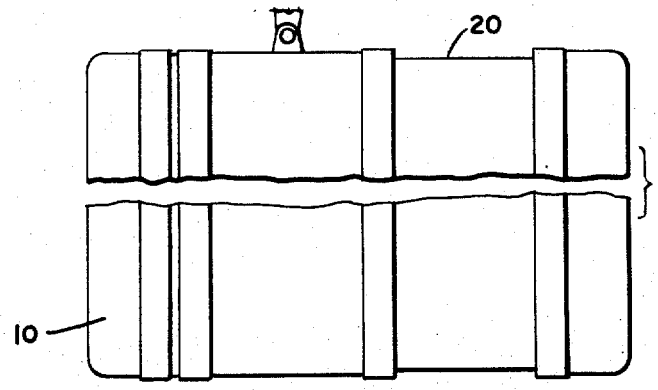
FIGURE 1 is an end elevation of a carrying case incorporating my invention, having two expansion joints, one of them being shown closed and the other expanded. For economy of space, just the top and bottom portions of the carrying case are shown in this figure.
Figure 2:
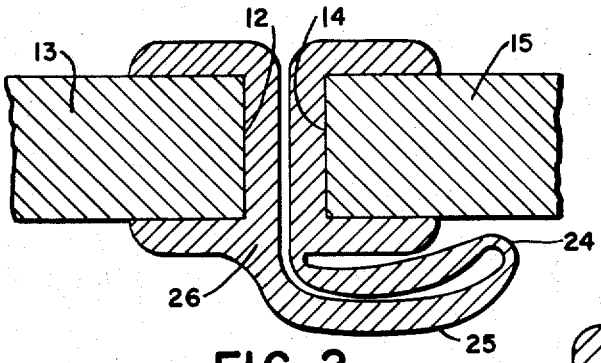
FIGURE 2 is an enlarged detail of a transverse vertical cross-section of the contracted joint.

When the corner of the carrying case is fully pushed into contracted configuration, the greater resistance to flex on the part of the wider web portion 25 with its fat throat 26 will throw the pair of members that are folded back upon themselves over to the configuration seen in FIGURE 2. This is a stable configuration and it will hold the case in contracted configuration. Pushing the case in to contracted configuration all the way around will produce this result all the way around.

To expand the case, one lifts with fingertips against the interior folded over mid-portion of the web, near flex hinge 24, and swings it interiorly away from the case, whereupon the case can be spread locally enough to let the web spring to its other stable state, namely fully spread as seen in FIGURE 3. Once the process is started and carried around one corner, the case can be pulled apart progressively around its periphery and assume and retain the fully expanded configuration.

Figure 4:
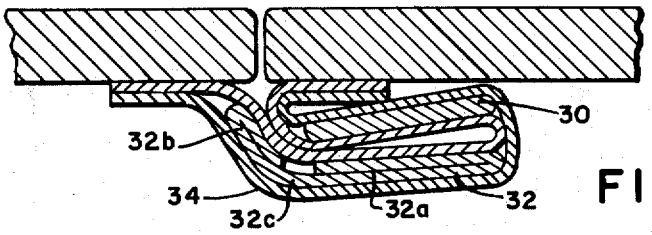
FIGURE 4 is a transverse vertical cross-section of a modified form using battens.

This invention can be embodied as shown in FIGURE 4. There, two battens, a narrower one 30 and a wider one 32, are secured to a web 34. The web may be of canvas or the like. The battens should be fairly stiff, yet resiliently flexible. The battens may be of brass, thin rust-proofed steel, or a suitable plastic. The wider batten 32 preferably has double thickness for more than half its width along the part 32a closer to the narrower batten, then a single-thickness longitudinal flex hinge 32c, and then a narrower double thickness part 32b. The battens are secured in any suitable manner, as for example by being sewn in pockets that are lengthwise continuous by the use of two thickness for the web as shown in the drawing. The outer edges of the battens are spaced in somewhat from the outer edges of the web. This allows for sewing of the web to the edges of the carrying case, and still allows lateral hinging of the battens. The battens are spaced apart a short distance in the center, enough to allow 180° flexing of the web there.

In use, this form operates essentially the same as the extruded form described earlier. The battens must have enough flexibility in relation to the sharpness of the corners of the carrying case so they can assume S curves at their inner edges when going through the transition condition between open and closed.

In the embodiments discussed thus far the web extends inwardly at the transition state, has a shorter path length at its inner edge, and depends upon a proper degree of stiffness in the web or part of it to resistively permit going through that transition state.

For uses where it is acceptable or advantageous to have the web on the outside of the case when in contracted form my invention can also be embodied in such reverse form. In this form the web extends outwardly at the transition stage, has a longer path length for the part of the web that extends out during the transition stage, and depends upon elastic pull to resistively permit the web to be stretched out in going through the transition stage. In this latter case I preferably provide a pair of opposed ribs that engage each other and serve as a detent to hold the web from pulling out of its folded-over contracted configuration. This detent feature can be used with, or instead of, the feature of having portions of the web relatively stiff.

Figure 5:
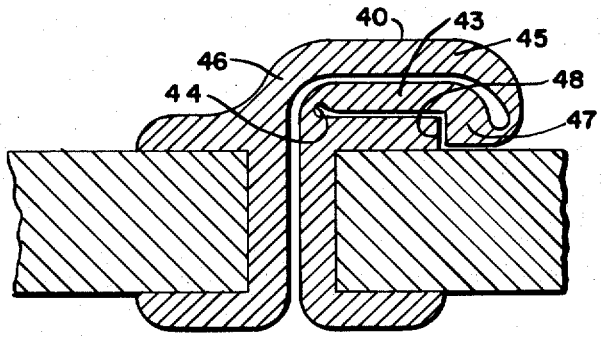
FIGURE 5 is a cross-section similar to FIGURE 2 but showing the collar arranged to fold over on the outside of the carrying case.

FIGURE 5 illustrates an embodiment of the reversed form, in which the concave and convex surfaces are the reverse of the form of FIGURES 1–4. From one side binding channel there rises a fairly heavy throat 46, whose thickness is preferably intermediate the maximum web thickness and the much-reduced hinge thickness. From that throat there continues, extending horizontally, the heavy wide web arm 40. (Wide equals long in transverse cross-section, and narrow equals short in transverse cross-section.) This wide web arm 40 bends back down, just as the throat extended up, and is joined by a thin hinge portion to the narrower web arm 43 which extends back to where it is joined by a reduced hinge portion 44. This hinge portion is located about at the top corner of the second side binding channel. The hinges are preferably of rounded contour for long flex life.

In the contracted configuration of the case, as shown in FIGURE 5, the hinge 44 is swung to the right and the narrower web arm, 43, lies back over the edge of the case. The next hinge is swung in the reverse direction, and the wider web arm, 40, lies over and snug against the narrower web arm 43. Opposed ribs that serve as detents are provided, to prevent chance rubbing from opening up the expansion joint. As here illustrated, the binding strip channel member has a sharp angled shoulder on top, and the narrower web arm, 43, extends just past same and has its far end sharply angled down to form a cap that fits over the shoulder, both together constituting a detent. This is particularly helpful when the web does not have any stiff portions.

To enlarge the suitcase one lifts the folded edge where the wider and narrower web arms join, pulling the angled cap part up from the sharply angled shoulder. The hinges at the two ends of the narrower web arm 43 swing open. The throat 46 is pushing the wider web arm 40 down to resist this. To some extent the wider web arm will swing up, and to some extent the narrower web arm will curve like a letter C (or if quite thin will creep like a flattened-down letter C). The edges of the case will pull apart, and the web extrusion will come to its other stable state, like FIGURE 3 but at the outside surface.

It would be possible to use an embodiment of the present invention along just part of the periphery of an expansion joint rather than around the entire periphery. In such case another fastening means could be used for the balance of the joint so as to make the case still expansible about the entire periphery. For example: the present type of closure could be used around the bottom and ends, and ordinary latches be used at the top. Or the present type of closure could be used across the bottom, and a fully-expansible always-engaged slide fastener such as disclosed in my application Ser. No. 663,079, filed Aug. 24, 1967, *now Pat. No. 3,443,671 issued May 13, 1969,* which is a continuation-in-part of my application Ser. No. 500,942, filed Aug. 22, 1965, now abandoned, could be used over the top and down the ends.

It will be appreciated that many various and many other embodiments of my invention may be made while utilizing teachings of the invention.

I claim:

1. A carrying case having along a peripheral joint an elongated web with one of its side portions secured to each of the joint edges and running around a non-straight portion of the periphery of the case, said web having [a plurality of] *at least one* relatively stiff portion[s] running around and generally paralleling the non-straight portions of the periphery, and stiff portion[s] being connected to [each other and to] said joint edges by flexible portions and being movable from an overlapping folded-over, contracted, stable state position, to a relatively unfolded, expanded, stable state position, the relatively stiff portion[s] of said web making it resistant to change from said contracted position to said expanded position but said web as a whole being sufficiently flexible to permit temporarily and resistively changing its position as it goes through transition from said contracted position to said expanded position.

2. Carrying case of claim 1 in which the web is an integral extruded elastomer.

3. Carrying case of claim 1 in which the web extends substantially completely around the peripheral joint.

4. Carrying case of claim 1 in which channels integral with the web, for securing and serving as bindings for the joint edges, are provided.

5. Carrying case of claim 1 in which the web [has at least one stiff longitudinal portion and it] is longitudinally flexible into S-shape compression curves in the vicinity of the corners of the case.

6. Carrying case of claim 1 in which the web extends inwardly *of the case* at the transition state and a web portion is too stiff to collapse along longitudinal fold lines but of a stiffness that resistively permits compressing in lengthwise curves.

7. Carrying case of claim 6 in which the web comprises a fabric web and relatively stiff but somewhat resiliently bendable battens secured to the fabric web.

8. Carrying case of claim 7 in which a first batten is narrower *than* [and] a second batten, *the* [is wider, this] wider batten having a relatively thin longitudinal flex hinge formed in it closer to its edge that is farther from the first batten.

9. Carrying case of claim 1, said web having different degrees of flexibility across its width, said web having a thin flexible hinge region close to one edge portion that is fastened to a carrying case edge, the adjacent web portion being relatively stiff and another hinge comprising another relatively thin flexible hinge region disposed at the other side of said relatively stiff portion.

10. Carrying case of claim 9 in which a second relatively stiff web portion is provided between the last-named thin flexible hinge region and the other end of the cross-section of the web.

11. Carrying case of claim 9 in which the web lies at the outer surface of the joint region and the portion of the web between the two flexible hinges is, in expanded configuration, somewhat dished, being convex toward the interior of the carrying case and said second web portion being somewhat dished in the opposite direction.

12. Carrying case of claim [9] *10* in which the stiff portion of the web between the two thin flexible hinges is narrower than the other stiff portion.

13. Carrying case of claim 12 in which the web lies at the interior side of the joint region and the portion of the web between the two thin flexible hinge regions is, in expanded configuration, somewhat dished, being concave toward the interior of the carrying case for the narrower portion and somewhat dished in the opposite direction for the wider portion.

14. Carrying case of claim 1 in which the web extends outwardly when going through the transition configuration and the web is resistively stretchable so it will permit going through the transition configuration but will exert a force tending to hold it in one stable position or the other.

15. Carrying case as in claim 14 in which a pair of opposed detent ridges is provided, one near the middle of said web and one near an edge of the web, located to engage and hold when the web is in folded-over contracted position.

16. Carrying case having along a peripheral joint an elongated web secured to each of the joint edges and running around a non-straight portion of the periphery of the case, said web being in a folded-over, contracted, stable state position and having a relatively narrow first web portion close to said case, a second relatively wider web portion on a side of said first web portion which is remote from said case and a hinge portion between said two web portions, said web being movable to a relatively unfolded, expanded, stable state position, said web being resistant to change from said contracted position to said expanded position but being sufficiently elastomeric to permit temporarily and resistively changing its position as it goes through transition from said contracted position to said expanded position.

*17. Carrying case of claim 16 in which the resistance to such change is provided by at least the first web portion being relatively stiff.*

*18. Carrying case of claim 16 in which the resistance to such change is provided by opposed ribs that serve as detents to hold the case in contracted position.*

References Cited

The following references, cited by the Examiner, are of record in the patented file of this patent or the original patent.

UNITED STATES PATENTS

| | | | |
|---|---|---|---|
| 2,002,878 | 5/1935 | Belber | 190—44 |

FOREIGN PATENTS

| | | |
|---|---|---|
| 2,026 | 4/1927 | Australia. |
| 1,101,785 | 4/1955 | France. |

GEORGE E. LOWRANCE, Primary Examiner

J. R. GARRETT, Assistant Examiner